United States Patent [19]
Anand et al.

[11] Patent Number: 5,435,836
[45] Date of Patent: Jul. 25, 1995

[54] HYDROGEN RECOVERY BY ADSORBENT MEMBRANES

[75] Inventors: Madhu Anand; Madhukar B. Rao, both of Allentown; Shivaji Sircar, Wescosville, all of Pa.

[73] Assignee: Air Products and Chemicals, Inc., Allentown, Pa.

[21] Appl. No.: 173,457

[22] Filed: Dec. 23, 1993

[51] Int. Cl.$^6$ .................... B01D 53/047; B01D 53/22
[52] U.S. Cl. .......................... 95/45; 95/50; 95/51; 95/96; 95/139; 95/143
[58] Field of Search ............ 95/45, 50, 51, 96, 139, 95/140, 143

[56] References Cited

U.S. PATENT DOCUMENTS

| | | | |
|---|---|---|---|
| 3,699,218 | 10/1972 | Smith et al. | 95/139 X |
| 4,077,779 | 3/1978 | Sircar et al. | 95/139 X |
| 4,229,188 | 10/1980 | Intille | 55/16 |
| 4,238,204 | 12/1980 | Perry | 55/16 |
| 4,398,926 | 8/1983 | Doshi | 55/16 |
| 4,639,257 | 1/1987 | Duckett et al. | 95/51 X |
| 4,645,516 | 2/1987 | Doshi | 95/51 |
| 4,654,063 | 3/1987 | Auvil et al. | 62/18 |
| 4,681,612 | 7/1987 | O'Brien et al. | 95/50 X |
| 4,690,695 | 9/1987 | Doshi | 55/16 |
| 4,701,187 | 10/1987 | Choe et al. | 55/16 |
| 4,783,203 | 11/1988 | Doshi | 55/16 |
| 4,836,833 | 6/1989 | Nicholas et al. | 55/16 |
| 5,073,356 | 12/1991 | Guro et al. | 423/415 A |
| 5,104,425 | 4/1992 | Rao et al. | 55/16 |
| 5,188,328 | 6/1992 | Wnuk et al. | 95/50 |
| 5,332,424 | 7/1994 | Rao et al. | 95/50 X |

*Primary Examiner*—Robert Spitzer
*Attorney, Agent, or Firm*—John M. Fernbacher

[57] ABSTRACT

Recovery of hydrogen from hydrogen-containing gas mixtures by pressure swing adsorption is increased by utilizing an adsorbent membrane to concentrate hydrogen in the pressure swing adsorption reject gas and recycling the resulting hydrogen-enriched stream to the feed of the pressure swing adsorption system. Lower compression requirements are realized compared with the use of polymeric membranes for the same service because the hydrogen-enriched stream is recovered from the adsorbent membrane as nonpermeate at essentially the membrane feed pressure. Simultaneous permeation of carbon dioxide and methane occur in the adsorbent membrane, which can be operated at feed pressures as low as 5 psig when hydrogen is used as a sweep gas.

29 Claims, 1 Drawing Sheet

HYDROGEN RECOVERY BY ADSORBENT MEMBRANES

FIELD OF THE INVENTION

This invention is directed towards improved product recovery in a pressure swing adsorption process, and in particular towards improving the recovery of hydrogen from steam-methane reformate in a pressure swing adsorption process by the use of adsorbent membranes.

BACKGROUND OF THE INVENTION

Pressure swing adsorption (PSA) is a well-known process for recovering light gases from mixtures which also contain heavier, more readily adsorbable components. The recovery of hydrogen from steam-methane reformate containing hydrogen, carbon oxides, and methane is a particularly well-suited application of the PSA process. Petroleum refinery gases containing hydrogen and hydrocarbons also are readily separated by the PSA process. The process is also useful for recovering helium from natural gas streams.

In a steam-methane reforming (SMR) process coupled to a PSA process for recovering hydrogen, a typical PSA feed from the SMR contains 70 vol % hydrogen, 25 vol % carbon dioxide, 4 vol % methane, and 1 vol % carbon monoxide. During the cyclic PSA process for hydrogen recovery, a reject gas stream containing up to 35 vol % hydrogen is withdrawn as adsorber vessel void space gas and/or purge effluent at low pressure, and this reject gas stream is typically used as reformer fuel. Because of this hydrogen loss, only about 80-85% of the hydrogen in a steam-methane reformate can be recovered by a conventional PSA system. It is desirable to increase overall hydrogen recovery by further treatment of the reject gas if such further treatment is cost effective.

One potential method to increase hydrogen recovery is to recycle a portion of the reject gas to the PSA feed. This can increase hydrogen recovery, but often is not cost effective because the low pressure reject gas which contains hydrogen as a minor component must be recompressed to a typical PSA feed pressure of 200–400 psig, although the feed pressure can range between 100 and 1000 psig. In addition, recycle reduces the net hydrogen concentration in the PSA feed, which reduces PSA performance if this concentration falls below about 70 vol %.

Various methods have been described in the art for using hydrogen-selective polymeric membranes to enrich PSA reject gas for recycle to increase hydrogen recovery. U.S. Pat. Nos. 4,229,188 and 4,238,204 describe the use of such hydrogen-permeable membranes for recycling a hydrogen-enriched gas to the feed of a multiple-bed PSA system. Membrane permeate which contains up to 97 vol % hydrogen is recompressed and recycled to the PSA to increase overall hydrogen recovery to 90%.

U.S. Pat. No. 4,836,833 discloses the operation of a two-stage multiple-bed PSA system for recovering hydrogen and carbon monoxide from steam-methane reformate. Carbon dioxide is removed from the feed gas in a parallel set of first stage adsorbers, and hydrogen is separated from carbon monoxide in a parallel set of second stage adsorbers. Reject gas from the second stage adsorbers is recompressed and passed through multiple polymeric membrane stages and the permeate, which is enriched in hydrogen and carbon dioxide, is recycled to the feed of the first stage adsorbers.

U.S. Pat. No. 4,783,203 discloses a hybrid PSA/membrane system for the recovery of a light component such as hydrogen from a mixture containing heavier components such as carbon monoxide. The PSA purge effluent is compressed and passed through a hydrogen-selective polymeric membrane module, and the hydrogen-lean nonpermeate gas is utilized as a displacement gas in the PSA system. Hydrogen-rich permeate gas optionally is used as a low pressure purge gas in the PSA system purge step.

These applications of polymeric membrane systems for improving PSA hydrogen recovery are characterized by a large pressure differential across the membrane which requires initial compression of the reject stream to provide a high pressure polymeric membrane feed (typically greater than 200 psig). Hydrogen selectively permeates through the membrane, so that recompression is required to recycle the hydrogen-rich permeate to the PSA system (typically 200 to 300 psig) for increased hydrogen recovery. These compression steps comprise a significant portion of the capital and operating cost of using a polymeric membrane system for improving PSA hydrogen recovery.

U.S. Pat. No. 5,104,425 discloses a composite semipermeable membrane comprising microporous adsorptive material supported by a porous substrate, and teaches the use of this membrane for separation of gas mixtures including hydrogen-hydrocarbon mixtures. This membrane differs from conventional polymeric membranes in that hydrocarbon impurities preferentially diffuse through the membrane and the hydrogen-rich product is withdrawn as a nonpermeate stream at a pressure slightly below the feed pressure.

Improved methods for hydrogen recovery will be needed as the expected demand for hydrogen increases in the petroleum refining, transportation, and related industries. In particular, it is desirable to increase hydrogen recovery when operating PSA systems on steam-methane reformate or refinery waste gases containing hydrogen. The present invention, which utilizes an adsorbent membrane separator integrated with a PSA system and steam-methane reformer as disclosed and defined in the following specification and claims, addresses this need for more efficient methods for the recovery and purification of hydrogen.

SUMMARY OF THE INVENTION

Pressure swing adsorption is utilized in the prior art to separate a feed gas comprising more strongly adsorbable components and less strongly adsorbable components into a product stream enriched in the less strongly adsorbable components and a reject stream enriched in the more strongly adsorbable components. The present invention is a method for improving the recovery of the less strongly adsorbable components in a pressure swing adsorption system which comprises passing at least a portion of the reject stream as a feed stream through a membrane zone having a permeable adsorbent membrane comprising adsorbent material which divides the zone into a feed side and a permeate side. The feed stream passes through the feed side of the membrane zone and portions of the more strongly adsorbable components selectively adsorb and permeate through the membrane in an adsorbed fluid phase. A permeate stream which is further enriched in the more strongly adsorbable components is withdrawn from the permeate side of the membrane zone, and a nonpermeate stream which is depleted in the more strongly adsorbable components and enriched in the less strongly adsorbable components is withdrawn from the feed side of the membrane zone. The nonpermeate stream is recycled to the pressure swing adsorption process to increase the recovery of the less strongly adsorbable components in said product stream. A portion of the permeate stream can be recycled to the feed side of the membrane zone by combining the portion and the feed streams.

A sweep gas optionally is passed through the permeate side of the membrane zone to enhance the permeation of the more strongly adsorbable components through the membrane, and a mixture of permeate and sweep gas is withdrawn therefrom. A portion of the withdrawn mixture can be recycled to the membrane zone feed.

In a preferred embodiment of the invention, a methane-containing feed is reacted with steam in a steam-methane reformer to yield a reformate comprising hydrogen, carbon oxides, and methane; this reformate is the feed to the pressure swing adsorption process. The less strongly adsorbable components comprise hydrogen and the more strongly adsorbable components comprise methane and carbon oxides, and the product from the pressure swing adsorption process is high purity hydrogen. At least a portion of the PSA reject is passed as a feed stream to the adsorbent membrane zone, and the hydrogen-enriched nonpermeate stream from the adsorbent membrane zone is recycled to the PSA feed. At least a portion of the mixture of permeate and sweep gas from the membrane zone is recycled to the steam-methane reformer as fuel, and another portion of the mixture optionally can be recycled as feed to the membrane zone.

DETAILED DESCRIPTION OF THE INVENTION

Figure 1:
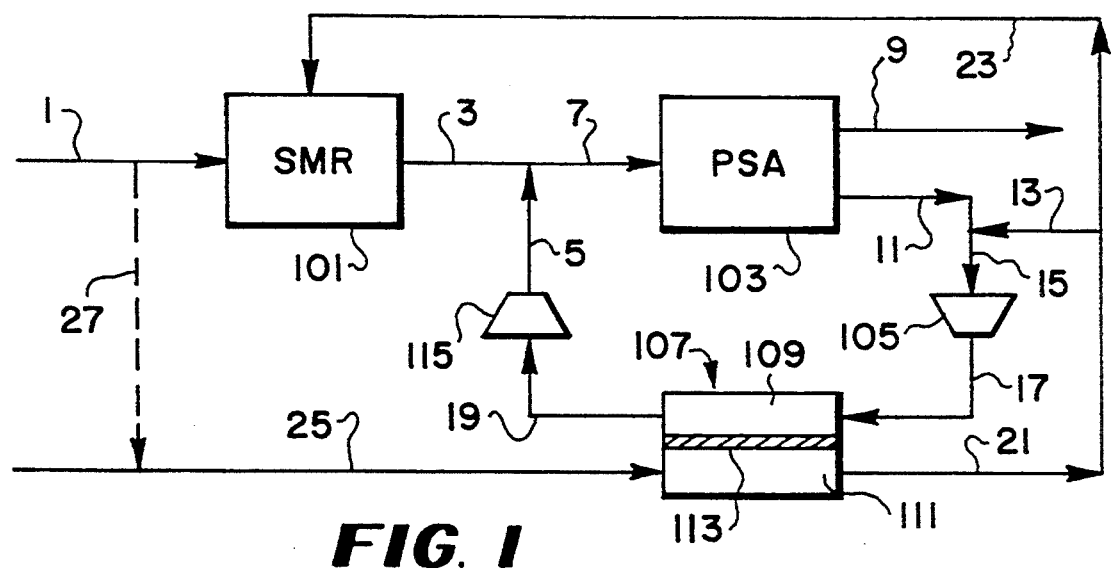
FIG. 1 is an embodiment of the present invention utilizing a single adsorbent membrane stage to increase the recovery of hydrogen from a steam-methane reformer pressure swing adsorption system.

A preferred embodiment of the present invention is illustrated in FIG. 1 in which the recovery of high purity hydrogen by PSA from a steam-methane reformate is improved by utilizing an adsorbent membrane to enrich the PSA reject gas in hydrogen and recycling the resulting enriched nonpermeate gas to the PSA feed. A more general embodiment is embraced within FIG. I in which the recovery of less strongly adsorbable components from a mixture with less strongly adsorbable components by a PSA system is improved by the use of an adsorbent membrane to concentrate the less strongly adsorbable components in the PSA reject gas and recycling the concentrated nonpermeate to the PSA feed.

The definition of the term "adsorbent membrane" as used in the present disclosure means any gas-permeable membrane containing adsorbent material which selectively adsorbs some of the components in a gas mixture, wherein portions of the adsorbed components permeate through the membrane in an adsorbed fluid phase. The preferred type of adsorbent membrane is described in U.S. Pat. No. 5,104,425 which is incorporated herein by reference. Other types of adsorbent membranes can be utilized in the present invention, for example, membranes which utilize a polymeric material to support or contain the adsorbent material.

The following description of the invention is based on the preferred embodiment of recovering hydrogen from steam-methane reformate which contains hydrogen, carbon oxides, and methane. The carbon oxides are carbon monoxide and carbon dioxide, and the relative concentrations of these two oxides in the reformate will be determined by the end products to be recovered. When hydrogen is the sole product, the raw reformate from the reformer reactor system is subjected to the water gas shift reaction to convert carbon monoxide into additional hydrogen and carbon dioxide. In this case the reformate gas to be separated has a typical composition of 70–75 vol % hydrogen, about 1% carbon monoxide, 20–25% carbon dioxide, and about 4% methane. In such gas mixtures, hydrogen is the less strongly adsorbable component relative to both the PSA adsorbent and the adsorbent material on the adsorbent membrane. The carbon oxides and methane are the more strongly adsorbable components relative to these adsorbents.

The following specific description of the integrated PSA and adsorbent membrane system for separating steam-methane reformate gas mixtures is representative of any gas mixture which contains less strongly adsorbable components (characterized herein by hydrogen) and more strongly adsorbable components (characterized herein by carbon oxides and methane), and the description therefore also supports the generic separation of mixtures containing more strongly adsorbable and less strongly adsorbable components. Other such mixtures include refinery waste streams containing hydrogen and light hydrocarbons, and mixtures of helium and natural gas components.

In the preferred embodiment illustrated in FIG. 1, methane-containing feed 1, typically natural gas, is catalytically reacted with steam in steam-methane reformer 101 as is known in the art to yield reformate 3 containing hydrogen, carbon oxides, unreacted methane, and residual water. The concentration of the carbon oxide species (i.e. carbon monoxide and carbon dioxide) will depend upon whether steam-methane reformer 101 includes a water gas shift step which converts carbon monoxide to additional hydrogen and carbon dioxide. As earlier discussed, the shift step is used to maximize hydrogen production when hydrogen is the sole end product. Reformate 3 at PSA feed pressure is combined with compressed recycle stream 5 and the combined stream 7, at a pressure between 100 and 1000 psig, preferably 200–400 psig, is fed to pressure swing adsorption system 103 typically at ambient-temperature.

PSA system 103 is a multiple-bed adsorption system which separates gas mixtures by selective adsorption using pressure swing for adsorption and desorption between higher and lower superatmospheric pressures, as is well known in the art. In some cases, the lower pressure can be subatmospheric, and this version of the process typically is defined as vacuum swing adsorption (VSA). In this specification, the term PSA includes any cyclic adsorption process which utilizes steps at superatmospheric or subatmospheric pressures. PSA system 103 produces a high purity hydrogen (the least strongly adsorbable component) product 9 essentially free of the more strongly adsorbable components containing at least 98 vol % hydrogen at a pressure between 150 and 400 psig. PSA reject stream 11 contains the more strongly adsorbable components methane, carbon monoxide, and carbon dioxide which were separated in PSA system 103 as well as some hydrogen typically lost in depressurization and purge steps. Reject stream 11, which typically contains about 35 vol % hydrogen and is at 3–5 psig, is optionally combined with recycle stream 13 and the combined stream 15 compressed if necessary in compressor 105 to a moderate pressure of 5–10 psig to yield feed stream 17 to membrane zone 107.

Membrane zone 107 is separated into feed side 109 and permeate side 111 by adsorbent membrane 113 which comprises adsorbent material supported by a porous substrate in which the adsorbent material is a coating on the surface of the substrate. Alternatively, some or all of the adsorbent material is contained within the pores of the substrate. The adsorbent material typically is selected from activated carbon, zeolite, activated alumina, silica, or combinations thereof. The characteristics and methods of preparation of adsorbent membranes are described in U.S. Pat. No. 5,104,425 which has been incorporated herein by reference. A preferred type of membrane for use in the present invention is made by coating a porous graphite substrate with a thin film of an aqueous suspension (latex) containing a polyvinylidine chloride polymer, drying the coated substrate at 150° C. for five minutes, heating the substrate in nitrogen to 600°–1000° C. at a rate of 1° C. per minute, holding at temperature for three hours, and cooling to ambient temperature at 1°–10° C. per minute. The polymer coating is carbonized during the heating step thereby forming an ultrathin layer of microporous carbon on the substrate. Other polymers can be used for coating prior to the carbonization step provided that these polymers can be carbonized to form the required porous carbon adsorbent material. Such alternate polymers can be selected from polyvinyl chloride, polyacrylonitrile, styrene-divinylbenzene copolymer, and mixtures thereof.

The adsorbent membrane and substrate can be fabricated in a tubular configuration in which the microporous adsorbent material is deposited on the inner and/or outer surface of a tubular porous substrate, and the resulting tubular adsorbent membrane elements can be assembled in a shell-and-tube configuration in an appropriate pressure vessel to form a membrane module. Alternatively, the adsorbent membrane and support can be fabricated in a flat sheet configuration which can be assembled into a module using a plate-and-frame arrangement. Alternatively, the adsorbent membrane and support can be fabricated in a monolith or multichannel configuration to provide a high membrane surface area per unit volume of membrane module. The monolith can be a porous ceramic, porous glass, porous metal, or a porous carbon material. A hollow fiber configuration may be used in which the adsorbent membrane is supported by fine hollow fibers of the substrate material. A plurality of membrane modules in parallel and/or series can be utilized when gas feed rates and separation requirements exceed the capability of a single module of practical size. Each of these configurations separates the membrane zone into a feed side and permeate side as illustrated in schematic fashion as membrane zone 107 in FIG. 1.

Feed stream 17 passes through feed side 109 of membrane zone 107, and the carbon oxides and methane contained therein selectively adsorb and permeate through adsorbent membrane 113 by the dominant mechanism of selective surface flow in the adsorbed phase. The resulting separation yields permeate 21 which is enriched in the carbon oxides and methane, and nonpermeate 19 which is enriched in hydrogen. Nonpermeate stream 19 is at a pressure slightly less than feed 17 due to the small pressure drop through feed side 109 while permeate 21 is at a significantly lower pressure, typically between 0.1 and 5 psig. Nonpermeate 19 is compressed to 200–300 psig by compressor 115 and combined with reformate 3 to provide feed 7 to PSA system 103. Recycling of hydrogen-enriched nonpermeate 19 increases the overall recovery of hydrogen in product 9.

A portion 13 of permeate 21 optionally is recycled to the feed of membrane zone 107 for increased hydrogen recovery; this is practical only when the concentration of carbon oxides and methane in permeate 21 is greater than the concentration in PSA reject 11. Another portion 23 which typically contains less than 20 vol % hydrogen is recycled to steam-methane reformer 101 for use as fuel. Membrane zone 107 is typically operated in the temperature range of 29°–50° C., but optionally may be operated at subambient temperatures below about −20° C. which enhances the membrane performance.

The performance of membrane zone 107 can be enhanced further by providing sweep gas 25 to sweep permeate side 111 which increases the effective partial pressure driving force across membrane 113 and in turn increases the net permeation rate for the more strongly adsorbed carbon oxides and methane. The sweep-to-feed ratio (the ratio of the molar flow rates of sweep 25 to feed 17) is 0.05 and 0.5, preferably between 0.05 and 0.25. Depending upon the type, pressure, and flow rate of the sweep gas and the method of distributing the sweep gas across the membrane, benefits can be realized in the operation of membrane zone 107. Such benefits include increased separation efficiency and reduced membrane area which result from increased driving force for the permeation of the more strongly adsorbed components. Methane and hydrogen are effective sweep gases, and are readily available as a portion 27 of methane feed 1 or alternately as a carefully controlled portion of high purity hydrogen product 9. Other sweep gases can be used if compatible with recycle of permeate to the steam-methane reformer and nonpermeate to the PSA system. Methane sweep enhances the permeation of carbon oxides through membrane 113, and if the methane partial pressure differential across membrane 113 is sufficient methane from feed 17 will continue to permeate through the membrane. Hydrogen sweep enhances the permeation of the carbon oxides and methane, and retards the permeation of hydrogen; if the sweep-to-feed ratio is selected properly overall hydrogen recovery can be increased as illustrated in the Examples which follow.

Alternatively, a mixture of hydrogen, carbon oxides, and methane can be used as sweep gas 25 provided that the partial pressures of the carbon oxides and methane in the sweep gas are lower than the corresponding partial pressures of these components in membrane feed 17.

When sweep is used, permeate stream 21 will also contain sweep gas which will be recycled in stream 13 to membrane zone 107 and stream 23 to steam-methane reformer 101. If the sweep-to-feed ratio is properly selected the presence of sweep gas in these recycle streams will have no adverse effect on the overall system operation.

A fundamental difference exists between the operation of the adsorbent membrane of the present invention and the polymeric membranes of the prior art methods described earlier, namely, that hydrogen selectively permeates polymeric membranes but not adsorbent membranes. Because of this difference, the hydrogen-enriched nonpermeate recycled to the PSA system from an adsorbent membrane is at a pressure significantly higher than the hydrogen-rich permeate from a polymeric membrane, and thus requires less compression power for recycle. Further, adsorbent membranes operate satisfactorily at significantly lower feed pressures than polymeric membranes, and therefore require lower membrane feed compression power. The significant and unexpected benefit of the present invention is reduced compression power and capital cost compared with prior art methods. This is illustrated in the Examples which follow.

Another important difference exists between the adsorbent membrane of the present invention and polymeric membranes for mixtures which contain hydrogen, carbon dioxide, and methane. Carbon dioxide and hydrogen are both known as "fast" gases and both preferentially permeate polymeric membranes relative to methane. Thus the non-permeate stream from a polymeric membrane separator will contain predominantly methane and the permeate stream will contain predominantly hydrogen and carbon dioxide; this permeate stream cannot be recycled to the PSA system without further separation. The selectivity of hydrogen relative to methane, i.e. the ratio of hydrogen permeability to methane permeability, for typical commercially-available polymeric membranes ranges from 200 to 300. The selectivity of carbon dioxide relative to methane is in the range of 20–40. Thus the permeate from a polymeric membrane recycled to the PSA system will have a significant concentration of carbon dioxide, and this will require additional PSA capacity to produce the required hydrogen product. For example, a second membrane stage would be needed to further enrich the recycle stream in hydrogen. In contrast, the adsorbent membrane of the present invention selectively permeates methane and carbon dioxide in a single stage and provides a nonpermeate recycle stream to the PSA system with a high hydrogen concentration. This important and unexpected characteristic of the invention is the basis for the efficient method for improving hydrogen recovery as described above.

Figure 2:
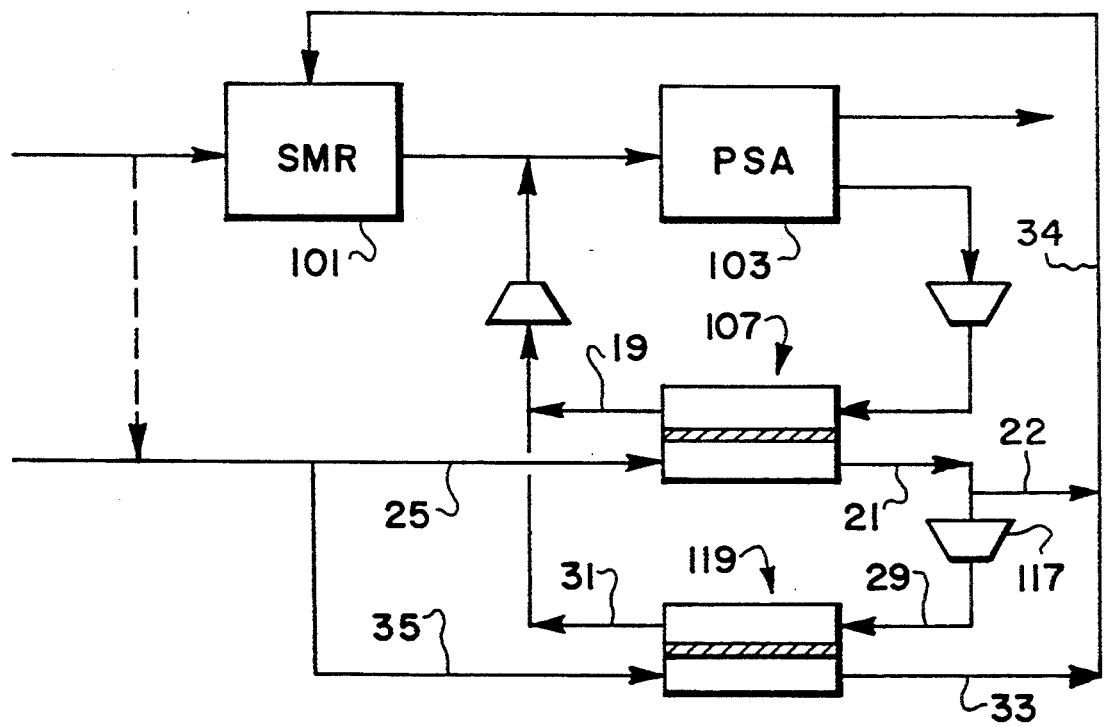
FIG. 2 is an alternative embodiment of the present invention utilizing two adsorbent membrane stages to increase the recovery of hydrogen from a steam-methane reformer pressure swing adsorption system.

An alternative embodiment of the invention is illustrated in FIG. 2 wherein a second stage adsorbent membrane is used for further improvement in hydrogen recovery. Permeate stream 21 containing 10–20 vol % hydrogen is compressed in compressor 117 to 5–100 psig and compressed feed 29 flows to second stage membrane zone 119. Membrane zone 119 is similar to membrane zone 107 and typically uses the same adsorbent membrane material, but may use an alternative adsorbent membrane material when appropriate. Nonpermeate stream 31 is enriched in hydrogen relative to membrane feed 29 and is combined with nonpermeate 19 for recycle to PSA system 103. Typically stream 31 is at a higher pressure than stream 19, so that a booster compressor (not shown) would be required to increase the pressure of stream 19 before combination with stream 31. Permeate stream 33 is recycled to steam-methane reformer 101 for use as fuel. Optionally a portion 22 of permeate stream 21 from membrane zone 107 is combined with permeate 33 to yield combined permeate 34 which is recycled to steam-methane reformer 101 for use as fuel. Sweep gas 35 may be used to enhance the performance of membrane zone 119 in the same manner as discussed above for membrane zone 107. Sweep gas 35 may be the same gas or a different gas then sweep gas 25. Membrane zone 119 can be operated in the range of pressures and temperatures as described for membrane zone 107. The molar flow ratio of membrane feed 29 to sweep 35 is between about 0.05 and 0.5.

The adsorbent membrane modules described above are typically operated at ambient temperatures, defined herein as temperatures above about 15° C. to as high as 50° C. Alternatively, as shown in Example 4, it may be desirable to operate at subambient temperatures, i.e. below about 15° C.

EXAMPLE 1

The direct recycle of PSA reject gas 11 to the feed of PSA system 103 operating on steam-methane reformate 3 was simulated and evaluated as a method for potentially increasing hydrogen recovery. Adsorbent membrane zone 107 is not used in the example. Different quantities of a PSA reject stream containing 35 vol % hydrogen, 55% carbon dioxide, and 10% methane are recycled to the PSA feed. The total feed to the PSA contains 75 vol % $H_2$, 20% $CO_2$, 1% CO, and 4% $CH_4$ at a flow rate of 20 million std cu ft/day. The PSA is assumed to operate at a feed pressure of 250 psig and the PSA reject stream is available at 5 psig. The PSA recovery is assumed to be 80% if the feed contains about 70% $H_2$. The overall hydrogen recoveries, the compressor HP, and the benefit/cost ratio were calculated for each level of recycle. The benefit is defined as the additional revenue from increased hydrogen production and the cost is defined as the cost of the compressor, compressor energy consumption, incremental fuel for the steam-methane reformer, and incremental increase in PSA adsorber size. The benefit/cost ratio is thus the ratio of the revenue from additional hydrogen recovery and the cost required to recover the additional hydrogen. The results are shown in Table 1.

TABLE 1

Benefit/Cost for Direct Recycle of PSA Reject Stream to PSA System (No Membrane) for Increased Hydrogen Production (Basis: PSA Feed of 20 Million std cu ft/day)

| % $H_2$ in Feed | Recycle, % of Reject | Compressor HP | Total $H_2$ Recovery, % | Benefit/Cost |
|---|---|---|---|---|
| 75.0 | 0 | 0 | 80.0 | 1.0 |
| 70.0 | 28 | 906 | 84.7 | 0.88 |
| 63.3 | 50 | 2190 | 84.9 | 0.56 |

The results show that the value of the additional hydrogen recovered is exceeded by the costs associated with recovering the additional hydrogen by this method. Thus the direct recycle of PSA reject gas to PSA feed is not a cost-effective method for increasing hydrogen recovery.

EXAMPLE 2

A carbon adsorbent membrane was prepared on a porous alumina tube with an average pore size of 200 Angstroms. The membrane was prepared by first coating the alumina support with a polyvinylidene chloride emulsion followed by pyrolysis at 600° C. to obtain a microporous carbon layer on the alumina. Multiple coats of carbon were applied to the membrane by sequential coating and pyrolysis to obtain the desired membrane separation characteristics. The details of membrane preparation are described in previously-cited U.S. Pat. No. 5,104,425. The tubular membrane was mounted in a shell-and-tube type module allowing gas feed on the tube or shell side. The corresponding permeate side was swept with a sweep gas in a countercurrent mode. Operation in a cocurrent mode was also possible.

The membrane performance was determined by feeding the membrane module with a gas mixture representative of a PSA reject gas which contained 35 vol % hydrogen, 55% carbon dioxide, and 10% methane. Carbon monoxide was not included in the feed mixture for safety reasons, but this component is expected to behave similarly to carbon dioxide in permeation through the adsorbent membrane. Flow rates and compositions of the permeate and nonpermeate streams were determined, and overall and individual mass balances were calculated. Using this information, the permeate and nonpermeate recoveries for each of the mixed gas components were determined. Permeate side recovery for a given component is defined as the ratio (expressed as a percentage) of the molar flow of the component in the permeate to the molar flow of the component in the membrane feed. Overall hydrogen recovery is defined as the ratio (expressed as a percentage) of the moles of hydrogen recovered by the PSA/membrane system to the moles of hydrogen in the PSA feed excluding recycle.

The membrane performance characteristics were then used to evaluate the benefits of combining the adsorbent membrane with a PSA system.

The adsorbent membrane performance was determined at several different feed pressures and flow rates using the above gas mixture. The permeation tests were performed in the range of 5–45 psig feed pressure. Methane was used as the sweep gas at 0.5 psig on the low pressure permeate side. The membrane separation characteristics and membrane area/feed rate were determined at these operating conditions. Using the experimentally measured separation properties, the effect of incorporating the membrane into the SMR/PSA process scheme shown in FIG. 1 was evaluated. The overall hydrogen recoveries, the compressor horsepower, and membrane areas were calculated at different operating conditions. Table 2 shows the results of these evaluations. A/F is the membrane area required per unit flow of feed gas and S/F is the sweep-to-feed flow ratio. Permeate side recovery and overall hydrogen recovery are defined as above.

TABLE 2

Effect of Adsorbent Membrane on Overall Hydrogen Recovery in a SMR/PSA System
Feed: 35% $H_2$, 55% $CO_2$, 10% $CH_4$ at 10 million std cu ft/day and 250 psig
Sweep: $CH_4$ at 0.5 psig

| Feed Pressure | S/F | Permeate Side Recoveries, % | | | Overall $H_2$ Recov., % | A/F, $ft^2$/(lb mole-hr) | Comp. HP |
|---|---|---|---|---|---|---|---|
| | | $H_2$ | $CO_2$ | $CH_4$ | | | |
| 13.5 psig | 0.12 | 77.8 | 95.3 | 74.4 | 83.7 | 23.0 | 21.8 |
| 13.5 psig | 0.12 | 47.5 | 81.0 | 48.0 | 89.4 | 15.2 | 23.8 |
| 31 psig | 0.11 | 49.4 | 85.5 | 56.2 | 89.0 | 11.0 | 40.8 |
| 31 psig | 0.11 | 31.7 | 72.2 | 38.2 | 92.6 | 8.8 | |

TABLE 2-continued

Effect of Adsorbent Membrane on Overall Hydrogen Recovery in a SMR/PSA System
Feed: 35% $H_2$, 55% $CO_2$, 10% $CH_4$ at 10 million std cu ft/day and 250 psig
Sweep: $CH_4$ at 0.5 psig

| Feed Pressure | S/F | Permeate Side Recoveries, % | | | Overall $H_2$ Recov., % | A/F, $ft^2$/(lb mole-hr) | Comp. HP |
|---|---|---|---|---|---|---|---|
| | | $H_2$ | $CO_2$ | $CH_4$ | | | |
| 31 psig | 0.07 | 43.9 | 71.3 | 47.0 | 90.1 | 9.8 | |

Based on the data of Table 2 it is concluded that the retrofit using the adsorbent membrane increases the overall hydrogen recovery in the SMR/PSA process from 80% for the base case without the membrane to 83–93% with the membrane depending on the membrane operating conditions.

The adsorbent membrane is capable of permeating both $CO_2$ and $CH_4$ to the low pressure side of the membrane while retaining an acceptable fraction of $H_2$ on the high pressure side. The significant permeation of $CH_4$ to the low pressure side of the membrane even with a $CH_4$ sweep is surprising and unexpected in light of prior art membrane systems. In addition, the adsorbent membrane allows the recovery of hydrogen at a pressure close to the membrane feed pressure as earlier described.

The membrane can be operated at significantly lower feed pressures than those commonly used for conventional polymeric membranes, i.e. 10–50 psig for the adsorbent membrane of the present invention vs. 150–250 psig for a typical polymeric membrane. Lower feed pressure and the recovery of hydrogen at close to the feed pressure reduces compression requirements for this invention compared with polymeric membranes for the same service. At a feed pressure of 13.5 psi, compression can be performed with a blower instead of a compressor, thus significantly reducing the capital and operating cost requirements for the adsorbent membrane compared with polymeric membranes.

The membrane area required to process a feed stream can be balanced with power requirements, with lower membrane areas required for separations performed at higher pressures. In addition, membrane performance can be varied by changing the methane sweep flow rate on the membrane permeate side. This is potentially useful in balancing the heat value of the permeate stream when used as fuel in the steam-methane reformer.

EXAMPLE 3

The adsorbent membrane of Example 2 was tested with the same gas mixture of Example 2 but with hydrogen instead of methane as sweep gas. The objective of the experiment was to determine if the hydrogen recovery on the non-permeate side and methane recovery on the permeate side could be increased with hydrogen sweep on the permeate side especially for operation at the PSA reject stream pressure (i.e. about 5 psig). The source of hydrogen for the sweep stream is a part of the product stream 9 from PSA system 103 in FIG. 1. The overall recovery of hydrogen from the SMR/PSA/adsorbent membrane system in this case would consist of additional hydrogen recovered from the membrane nonpermeate side less the hydrogen used for the membrane sweep stream. Table 3 shows the membrane performance with hydrogen and methane as sweep gases, and the overall hydrogen recovery from the integrated SMR/PSA/adsorbent membrane system. The example with methane sweep is included for reference.

The results of Table 3 show that the adsorbent membrane can be operated at a feed pressure 5 psig if the low pressure permeate side 111 is swept with hydrogen. High permeate recoveries of $CO_2$ and $CH_4$ can be achieved with such a hydrogen sweep. The simultaneous permeation of $CO_2$ and $CH_4$ and the ability to operate the membrane at such a low pressure are unexpected benefits which would not be expected from known prior art.

The adsorbent membrane cannot be operated with a $CH_4$ sweep and a feed pressure of 5 psig, however, since no methane will permeate to the low pressure side. This would allow the $CH_4$ concentration in PSA feed 7 to build up with time, which is not acceptable. The use of a methane sweep is feasible only when the methane partial pressure on feed side 109 exceeds the methane partial pressure on permeate side 111 of the membrane, which is achieved at membrane feed pressures above about 10 psig.

The use of the adsorbent membrane improves the overall hydrogen recovery to as high as 85% at the selected operating conditions of the membrane compared with the base PSA recovery of 80%. Compression of PSA reject stream 11 to feed the adsorbent membrane is not absolutely required. Thus only one compressor is required, namely compressor 115, to increase the pressure of recycle stream 5 to the PSA feed pressure.

The adsorbent membrane is preferably operated at high recoveries of $CO_2$ and $CH_4$ in low pressure permeate stream 21 in order to minimize the sizes of recycle stream 19 and compressor 115. This also helps maintain the concentration of $H_2$ at above 70% in PSA feed 7 to maintain the PSA $H_2$ recovery at acceptable levels.

EXAMPLE 4

The experiments of Example 2 were repeated at 3° C. to determine if hydrogen recovery could be increased by operating the membrane at a subambient temperature. It would be expected that the adsorption of the adsorbable species in the feed gas (i.e. $CO_2$ and $CH_4$) in the carbon membrane pores would be increased at the lower temperature. This would have the effect of pore blocking thus reducing the permeation of hydrogen through the membrane. Increased adsorption of the adsorbable species at the lower temperature would increase the driving force for permeation of the adsorbed gases (i.e. for $CO_2$ and $CH_4$). However, the diffusion coefficient would be lower at the lower temperature. Thus, the overall effect of lower temperature on the permeation of the adsorbed species would be a combination of the two effects, but would be difficult to predict.

The experimental membrane performance and calculated hydrogen recovery are summarized in Table 4 and show the effect of temperature on the carbon membrane separation characteristics. Hydrogen recovery in nonpermeate stream 19 (manifested by lower permeate side recovery) is in fact increased by operating the membrane at a lower temperature. The permeate side recoveries of methane and carbon dioxide are also reduced, but the overall hydrogen recovery is improved at the lower temperature. The optimum temperature and operating conditions can be chosen based on feed composition and membrane performance requirements.

TABLE 4

Operation of Adsorbent Membrane at Subambient Temperature
Feed: 35% $H_2$, 55% $CO_2$, 10% $CH_4$ at 10 million std cu ft/day
Sweep: $H_2$ or-$CH_4$ at 0:5 psig
S/F = (membrane sweep flow rate)/(membrane feed flow rate)

| Feed Pres. psig | Sweep Gas | Temp., °C. | S/F | $A_2$/F, $ft^2$/(lb mole-hr) | Permeate Side Recoveries, % | | | Overall $H_2$ Recov., % |
|---|---|---|---|---|---|---|---|---|
| | | | | | $H_2$ | $CO_2$ | $CH_4$ | |
| 5.0 | $CH_4$ | 20 | 0.12 | 45.5 | 39.4 | 60.1 | 0.0 | — |
| 5.0 | $CH_4$ | 3 | 0.12 | 45.5 | 25.5 | 46.0 | 0.0 | — |
| 5.0 | $H_2$ | 20 | 0.12 | 45.5 | 6.2 | 44.8 | 33.0 | — |
| 5.0 | $H_2$ | 3 | 0.12 | 45.5 | 3.1 | 34.3 | 23.8 | — |
| 5.0 | $H_2$ | 20 | .12 | 151.3 | 54.6 | 85.0 | 74.7 | 80.4 |
| 5.0 | $H_2$ | 3 | .12 | 151.3 | 26.8 | 62.9 | 50.9 | 81.2 |

Thus the use of an adsorbent membrane to recover and recycle hydrogen from PSA reject gas is an improved alternative to the prior art use of polymeric membranes for this purpose. The invention is particularly useful in the recovery of hydrogen from steam-methane reformate containing hydrogen and carbon oxides, since it has been found unexpectedly that carbon oxides and methane selectively permeate over hydrogen at low feed pressures and can thus be recycled to the PSA to increase overall hydrogen recovery. Thus PSA reject gas can be enriched in hydrogen by an adsorbent membrane in a single stage at low feed pressures, which is not possible using prior art polymeric membranes. In addition, the method of the present invention exhibits low compression and power requirements compared with methods using a polymeric membrane because (1) the adsorbent membrane can be operated at relatively low feed pressures (10–50 psig) and (2) the hydrogen-enriched nonpermeate stream from the adsorbent membrane is recovered at near feed pressure. A polymeric membrane operates at distinctly different conditions, namely, (1) it requires operation at an elevated feed pressure and (2) the hydrogen-enriched permeate stream is recovered at low pressure. Alternatively, the adsorbent membrane can be operated at a very low feed pressure (3–10 psig) by using a hydrogen sweep on the permeate side, which is not possible with a polymeric membrane.

The essential characteristics of the present invention are described completely in the foregoing disclosure. One skilled in the art can understand the invention and make various modifications thereto without departing from the basic spirit thereof, and without departing from the scope of the claims which follow.

We claim:

1. In a pressure swing adsorption process which separates a feed gas comprising more strongly adsorbable components and less strongly adsorbable components into a product stream enriched in said less strongly adsorbable components and a reject stream enriched in said more strongly adsorbable components, a method for improving the recovery of said less strongly adsorbable components in said product stream which comprises:

(a) passing at least a portion of said reject stream as a feed stream through a membrane zone having a permeable adsorbent membrane comprising adsorbent material which divides the zone into a feed side and a permeate side, wherein said feed stream passes through the feed side of said membrane zone and portions of said more strongly adsorbable components selectively adsorb and permeate through the membrane in an adsorbed fluid phase;

(b) withdrawing from the permeate side of said membrane zone a permeate stream which is further enriched in said more strongly adsorbable components and withdrawing from the feed side of said membrane zone a nonpermeate stream which is depleted in said more strongly adsorbable components and enriched in said less strongly adsorbable components; and (c) recycling said nonpermeate stream to said pressure swing adsorption process to increase the recovery of said less strongly adsorbable components in said product stream.

2. The method of claim 1 which further comprises recycling a portion of said permeate stream to the feed side of said membrane zone by combining said portion with said feed stream, wherein the concentrations of said more strongly adsorbable components in said permeate stream are higher than the concentrations of said more strongly adsorbable components in said feed stream.

3. The method of claim 1 which further comprises passing a sweep gas through the permeate side of said membrane zone to enhance the permeation of said more strongly adsorbable components through said membrane, and withdrawing therefrom a mixture of permeate and sweep gas.

4. The method of claim 3 wherein said sweep gas comprises one or more of said more strongly adsorbable components, one or more of said less strongly adsorbable components, or mixtures thereof.

5. The method of claim 3 wherein the molar flow ratio of said sweep gas to said reject stream is between about 0.05 and 0.5.

6. The method of claim 1 which further comprises reforming a methane-containing feed in a steam-methane reformer to yield a reformate comprising hydrogen, carbon oxides, and methane, wherein said reformate provides said feed gas to said pressure swing adsorption process, and wherein said less strongly adsorbable components comprise hydrogen and more strongly adsorbable components comprise said methane and carbon oxides, and wherein said product from said pressure swing adsorption process is high purity hydrogen.

7. The method of claim 6 which further comprises recycling at least a portion of said permeate stream from said membrane zone to said steam-methane reformer as fuel.

8. The method of claim 6 which further comprises recycling a portion of said permeate stream to the feed side of said membrane zone by combining said portion with said feed stream, wherein the concentrations of said more strongly adsorbable components in said permeate stream are higher than the concentrations of said more strongly adsorbable components in said feed stream.

9. The method of claim 6 which further comprises passing a sweep gas through the permeate side of said membrane zone to enhance the permeation of said more strongly adsorbable components through said membrane, and withdrawing therefrom a mixture of permeate and sweep gas.

10. The method of claim 9 wherein the molar flow ratio of said sweep gas to said feed stream is between about 0.05 and 0.5.

11. The method of claim 10 wherein said sweep gas is provided by either a portion of said methane-containing feed to said steam-methane reformer or a portion of said high purity hydrogen product from said pressure swing adsorption process.

12. The method of claim 10 wherein said sweep gas is provided by a portion of said high purity hydrogen product from said pressure swing adsorption process and the pressure on the feed side of said membrane zone is between about 3 and 10 psig.

13. The method of claim 9 which further comprises recycling at least a portion of said mixture of permeate and sweep gas to said steam-methane reformer as fuel.

14. The method of claim 9 which further comprises recycling a portion of said mixture of permeate and sweep gas to the feed side of said membrane zone by combining said mixture with said feed stream, wherein the concentrations of said more strongly adsorbable components in said mixture of permeate and sweep gas are higher than the concentrations of said more strongly adsorbable components in said feed stream.

15. The method of claim 6 wherein the pressure on the feed side of said membrane zone is between about 5 and 100 psig and the pressure on the permeate side of said membrane zone is between about 0.1 and 10 psig.

16. The method of claim 15 wherein said membrane zone is operated at a temperature at or above about 15° C.

17. The method of claim 15 wherein said membrane zone is operated at a temperature below about 15° C.

18. In a pressure swing adsorption process which separates a feed gas comprising more strongly adsorbable components and less strongly adsorbable components into a product stream enriched in said less strongly adsorbable components and a reject stream enriched in said more strongly adsorbable components, a method for improving the recovery of said less strongly adsorbable components in said product stream which comprises:

(a) passing at least a portion of said reject stream as a first feed stream through a first membrane zone having a permeable adsorbent membrane comprising adsorbent material which divides the zone into a feed side and a permeate side, wherein said reject stream passes through the feed side of said first membrane zone and portions of said more strongly adsorbable components selectively adsorb and permeate through the membrane in an adsorbed fluid phase;

(b) passing a first sweep gas through the permeate side of said first membrane zone, withdrawing therefrom a first sweep/permeate stream, and withdrawing from the feed side of said first membrane zone a first nonpermeate stream which is depleted in said more strongly adsorbable components and enriched in said less strongly adsorbable components;

(c) passing said first sweep/permeate stream as a second feed stream through a second membrane zone having a permeable adsorbent membrane comprising adsorbent material which divides the zone into a feed side and a permeate side, wherein said first sweep/permeate stream passes through the feed side of said second membrane zone and additional portions of said more strongly adsorbable components contained therein permeate through the membrane in an adsorbed fluid phase;

(d) passing a second sweep gas through the permeate side of said second membrane zone and withdrawing therefrom a second sweep/permeate stream, and withdrawing from the feed side of said membrane zone a second nonpermeate stream which is depleted in said more strongly adsorbable components and enriched in said less strongly adsorbable components; and (e) recycling said first and second nonpermeate streams to said pressure swing adsorption process to further increase the recovery of said less strongly adsorbable components in said product stream.

19. The method of claim 18 which further comprises reforming a methane-containing feed in a steam-methane reformer to yield a reformate comprising hydrogen, carbon oxides, and methane, wherein said reformate provides said feed gas to said pressure swing adsorption process, and wherein said less strongly adsorbable components comprise hydrogen and said more strongly adsorbable components comprise methane and carbon oxides.

20. The method of claim 19 wherein the molar flow ratio of said first sweep gas to said first feed stream is between about 0.05 and 0.5.

21. The method of claim 19 wherein said first sweep gas is provided by a portion of said methane-containing feed to said steam-methane reformer.

22. The method of claim 19 wherein said first sweep gas is provided by a portion of said hydrogen from said pressure swing adsorption process.

23. The method of claim 19 wherein the molar flow ratio of said second sweep gas to said second feed stream is between about 0.05 and 0.5.

24. The method of claim 19 wherein said second sweep gas is provided by a portion of said methane-containing feed to said steam-methane reformer.

25. The method of claim 19 wherein said second sweep gas is provided by a portion of said hydrogen from said pressure swing adsorption process.

26. The method of claim 19 which further comprises recycling at least a portion of said second sweep/permeate stream from said second membrane zone to said steam-methane reformer as fuel.

27. The method of claim 19 wherein the feed side pressures of said first and second membrane zones are between about 5 and 100 psig.

28. The method of claim 19 wherein said first and second membrane zones are operated at temperatures at or above about 15° C.

29. The method of claim 19 wherein either or both of said membrane zones are operated at temperatures below about 15° C.

* * * * *